United States Patent
Mettath et al.

(10) Patent No.: US 10,597,576 B2
(45) Date of Patent: Mar. 24, 2020

(54) LUBRICANT FOR WATER BASED DRILLING FLUID

(71) Applicant: The Lubrizol Corporation, Wickliffe, OH (US)

(72) Inventors: Sashikumar Mettath, Spring, TX (US); Zen-Yu Chang, Conroe, TX (US)

(73) Assignee: THE LUBRIZOL CORPORATION, Wickliffe, OH (US)

( * ) Notice: Subject to any disclaimer, the term of this patent is extended or adjusted under 35 U.S.C. 154(b) by 51 days.

(21) Appl. No.: 15/771,567

(22) PCT Filed: Nov. 1, 2016

(86) PCT No.: PCT/US2016/059845
§ 371 (c)(1),
(2) Date: Apr. 27, 2018

(87) PCT Pub. No.: WO2017/079123
PCT Pub. Date: May 11, 2017

(65) Prior Publication Data
US 2019/0078009 A1 Mar. 14, 2019

Related U.S. Application Data

(60) Provisional application No. 62/249,392, filed on Nov. 2, 2015.

(51) Int. Cl.
| | |
|---|---|
| C09K 8/24 | (2006.01) |
| C09K 8/035 | (2006.01) |
| C10M 173/02 | (2006.01) |
| C10M 145/38 | (2006.01) |
| C10M 129/74 | (2006.01) |

(52) U.S. Cl.
CPC .............. C09K 8/24 (2013.01); C09K 8/035 (2013.01); C10M 129/74 (2013.01); C10M 145/38 (2013.01); C10M 173/02 (2013.01); *C09K 2208/28* (2013.01); *C09K 2208/34* (2013.01); *C10M 2207/283* (2013.01); *C10M 2207/289* (2013.01); *C10M 2209/109* (2013.01); *C10M 2215/042* (2013.01); *C10M 2219/022* (2013.01); *C10M 2223/045* (2013.01); *C10N 2210/02* (2013.01); *C10N 2220/021* (2013.01); *C10N 2230/06* (2013.01)

(58) Field of Classification Search
None
See application file for complete search history.

(56) References Cited

U.S. PATENT DOCUMENTS

| | | | |
|---|---|---|---|
| 3,632,510 | A | 1/1972 | Lesuer |
| 4,234,435 | A | 11/1980 | Meinhardt et al. |
| 4,776,966 | A * | 10/1988 | Baker .................. C09K 8/36 507/117 |
| 5,137,980 | A | 8/1992 | Degonia et al. |
| 5,434,323 | A * | 7/1995 | Durand .................. C07C 7/20 208/187 |
| 5,633,220 | A * | 5/1997 | Cawiezel .............. C09K 8/64 507/117 |
| 2004/0154216 | A1 | 8/2004 | Huffer et al. |
| 2011/0309001 | A1* | 12/2011 | Soane .................. C09K 8/524 208/390 |
| 2015/0232737 | A1* | 8/2015 | Schmidt .............. C04B 28/005 166/305.1 |

FOREIGN PATENT DOCUMENTS

EP 0068601 A1 1/1983

* cited by examiner

*Primary Examiner* — John J Figueroa
(74) *Attorney, Agent, or Firm* — Christopher P. Demas; Teresan W. Gilbert

(57) ABSTRACT

The invention relates an additive composition for a drilling fluid, as well as a method of increasing the lubricity and reducing the coefficient of friction of a drilling fluid. The additive composition may further contain a sulfurized olefin and/or a metal dithiophosphate compound, which further enhances the lubricating effect.

14 Claims, No Drawings

LUBRICANT FOR WATER BASED DRILLING FLUID

BACKGROUND OF THE INVENTION

The invention relates an additive composition for a drilling fluid, as well as a method of increasing the lubricity and reducing the coefficient of friction of a drilling fluid. The additive composition may further contain a sulfurized olefin and/or a metal dithiophosphate compound, which further enhances the lubricating effect.

Drilling fluids, also referred to as drilling muds, are frequently circulated in a wellbore during drilling operations in order to cool and lubricate the drilling apparatus, lift cuttings out of the wellbore and counterbalance the subterranean formation pressure encountered during drilling. One of the functions of a drilling fluid is to reduce the considerable torque associated with the rotating drill stem caused by the friction between the outside of the drill pipe and the wall of the well and/or casing strings. Drilling through offsets, deep wells and highly deviated or horizontal wells results in increased frictional forces, increasing the demand on the lubricating properties of the drilling fluids.

Oil-based drilling muds (or "oil muds") may be necessary or beneficial in certain circumstances, such as when drilling through formations containing expansive clays that swell upon contact with water. However, water-based drilling muds (also called "water muds") are used much more commonly. Besides water, the main ingredient of a typical water mud is a viscosity agent, usually a fine-grained clay, which mixes with the water to form a slurry. Bentonite, which consists predominantly of an expansive clay called montmorillonite, is widely used in water muds, although other types of clay may be used as well.

In industry drilling operations, attempts have been made to reduce friction in drilling muds.

SUMMARY OF THE INVENTION

The disclosed technology, therefore, solves the problem of increasing the lubricity and reducing the coefficient of friction of a drilling fluid by including in the drilling fluid an oligomer as disclosed herein, optionally in the presence of a sulfurized olefin and/or a metal dithiophosphate.

One aspect of the present technology involves a lubricant additive composition for a water based drilling fluid. The lubricant additive can include at least one oligomer, wherein the oligomer encompasses the reaction product of: at least one hydrocarbyl substituted carboxylic acid or an ester or anhydride thereof; and at least one polyalkylene glycol.

In an embodiment, the carboxylic acid of the hydrocarbyl substituted carboxylic acid can be, but is not necessarily limited to, oxalic acid, malonic acid, succinic acid, glutaric acid, adipic acid, pimelic acid, suberic acid, azelic acid, sebacic acid, undecanedioic acid, dodecanedioic acid, maleic acid, fumaric acid, glutaconic acid, traumatic acid and muconic acid, phthalic acid, isophthalic acid, terephthalic acid or diphenic acid.

In another embodiment, the hydrocarbyl substituent of the hydrocarbyl substituted carboxylic acid can include a $C_6$ to $C_{36}$ straight chain or branched alkane or alkene. In some embodiments, the hydrocarbyl substituted carboxylic acid can include dodecenyl succinic anhydride. In the same or different embodiments, the hydrocarbyl substituted carboxylic acid include octadecenyl succinic anhydride In an embodiment, the polyalkylene glycol can be one or more of polyethylene glycol or polypropylene glycol. In some embodiments, the polyalkylene glycol includes diethylene glycol. In further embodiments, the polyalkylene glycol encompasses polypropylene glycol having a Mn of less than 2000.

In some embodiment's, the lubricant additive composition can further include at least one amine. In some embodiments, the amine can include at least one alkanolamine. In certain embodiments, the amine can be an alkanolamine including, for example, ethanolamine, diethanolamine, triethanolamine, and mixtures thereof.

In embodiments, the oligomer or a blend of the oligomer and the amine, may be present in the lubricant additive composition from about 1 to about 100 wt % of the composition.

In further embodiments, the lubricant additive composition can additionally include from about 0.01 to about 10 wt. % of a metal dithiophosphate compound, such as, for example, zinc dialkyldithiophosphate.

In still further embodiments, the lubricant additive composition can further include from about 0.01 to about 10 wt. % of a sulfurized olefin.

Another aspect of the technology encompasses a water based drilling fluid containing from about 0.01 to about 10 wt. % of the lubricant additive composition as described herein, and water.

A still further aspect of the present technology encompasses a method of lubricating a drilling fluid by adding to the drilling fluid a lubricant additive composition as disclosed herein.

In an even further aspect, the present technology provides a method of increasing the lubricity and decreasing the coefficient of friction of a water-based drilling fluid by adding to the water-based drilling fluid a lubricant additive composition as described herein.

DETAILED DESCRIPTION OF THE INVENTION

Various preferred features and embodiments will be described below by way of non-limiting illustration.

One aspect of the invention relates to a lubricant additive composition for a water based drilling fluid containing at least one oligomer. The oligomer can be effective in one or more of increasing the lubricity and decreasing the coefficient of friction of a well treatment composition. In some embodiment, the additive composition can further include at least one amine. Likewise, the additive composition can further include at least one metal dithiophosphate compound, at least one sulfurized olefin, and mixtures thereof, whether in addition to or in place of the at least one amine.

Oligomer

The production of the oligomer used in the additive composition results in a mixture of compounds, and this mixture can be difficult to define apart from the process steps employed to produce the oligomer. Further, the process by which the oligomer is produced can be influential in imparting distinctive structural characteristics to the final oligomer that can affect the properties of the oligomer, and the additive composition to which the oligomer is added.

Thus, in one embodiment, the at least one oligomer may be described as the reaction product of at least one hydrocarbyl substituted carboxylic acid, or an ester or anhydride thereof, and at least one polyalkylene glycol. As used herein, reference to the oligomer encompasses the mixture of compounds including the oligomer as described herein, as well as referring to the oligomer itself.

The Hydrocarbyl Substituted Carboxylic Acid Component

The hydrocarbyl substituted carboxylic acid can be the reaction product of the precursor to the hydrocarbyl-substituent, which is a long chain hydrocarbon, generally a polyolefin, with a monounsaturated carboxylic acid reactant such as (i) α,β-monounsaturated $C_3$ to $C_{20}$ dicarboxylic acid; (ii) derivatives of (i) such as anhydrides or $C_1$ to $C_5$ alcohol derived mono- or di-esters of (i); (iii) α,β-monounsaturated $C_3$ to $C_{18}$ monocarboxylic acids such as acrylic acid and methacrylic acid; or (iv) derivatives of (iii) such as $C_1$ to $C_5$ alcohol derived esters of (iii).

Example α,β-monounsaturated dicarboxylic acids suitable for reacting with the hydrocarbyl substituent may be aliphatic, aromatic, or combinations thereof. Suitable acids may contain from 3, 4, or 6 to 20, 15, 8, or 6 carbon atoms, and in some embodiments may contain 3 to 15, 4 to 15, 4 to 8, or even 6 carbon atoms. In some embodiments, the α,β-monounsaturated dicarboxylic acids include fumaric or maleic acid (e.g., hydrocarbyl substituted succinic acid); glutaconic acid (e.g., hydrocarbyl substituted glutaric acid); hex-2-enedioic acid (e.g., hydrocarbyl substituted adipic acid); hept-2-enedioic acid (e.g., hydrocarbyl substituted pimelic acid); oct-2-enedioic acid (e.g., hydrocarbyl substituted suberic acid); non-2-enedioic acid (e.g., hydrocarbyl substituted azelaic acid), dec-2-enedioic acid (e.g., hydrocarbyl substituted sebacic acid); undec-2-enedioic acid (e.g., hydrocarbyl substituted undecanedioic acid), traumatic acid (e.g., hydrocarbyl substituted dodecanedioic acid), cyclohexene-1,[2,3,4]-dicarboxylic acid (e.g., hydrocarbyl substituted cyclohexane-1,[2,3,4]-dicarboxylic acid); citraconic or mesaconic acid (e.g., hydrocarbyl substituted methylsuccinic acid); or combinations thereof. In other embodiments, one or more of the dicarboxylic acids listed may be excluded from the hydrocarbyl substituted carboxylic acid.

In some embodiments, the dicarboxylic acid of the invention may also be derived from an ester or anhydride of one or more acids described above or combinations of such materials. Suitable esters include, in one embodiment, lower alkyl esters such as dimethyl adipate or diethyl adipate. Suitable anhydrides include succinic anhydride, alkyl and/or alkenyl succinic anhydride, tetrahydrophthalic anhydride. Blends of two or more acids may be used. In some embodiments the dicarboxylic acid includes a dimer acid, a trimer acid, or a fatty dimer acid. Dimer and trimer acids is the general term applied to products obtained by the reaction of two or more molecules of unsaturated fatty acids or unsaturated fatty acid esters, obtained from tall oil, oleic acid, canola oil or cottonseed oil, usually on clay catalysts. Examples of commercially available dimer, trimer and fatty dimer acids include Empol® available from BASF, and Pripol™ available from Croda.

The hydrocarbyl-substituent can be a $C_6$ to $C_{36}$, for example $C_8$ to $C_{32}$, or $C_8$ to $C_{28}$, such as $C_{10}$ to $C_{26}$, or $C_{10}$ to $C_{22}$, straight chain or branched alkane or alkene. In one embodiment, the hydrocarbyl group can be a long chain hydrocarbyl group having a number average molecular weight (Mn) of from about 1300 to about 5000. The Mn of the hydrocarbyl-substituent can also be from about 1500 to about 3000 or 3500, or from about 1700 to about 2700, or from about 1900 to about 2600, or about 2000 to about 2500. In an embodiment, Mn of the hydrocarbyl-substituent can also be from about 300 to about 1000, or from about 400 to about 900, or from about 500 to about 800. In an embodiment, the hydrocarbyl-substituent can be any compound containing an olefinic bond represented by the general formula:

wherein each of $R^1$ and $R^2$ is, independently, hydrogen or a hydrocarbon based group. Each of $R^6$, $R^7$ and $R^8$ is, independently, hydrogen or a hydrocarbon based group; preferably at least one is a hydrocarbon based group containing at least 20 carbon atoms.

Olefin polymers for reaction with the monounsaturated carboxylic acids can include polymers comprising a major molar amount of $C_2$ to $C_{20}$, e.g. $C_2$ to $C_5$ monoolefin. Such olefins include ethylene, propylene, butylene, isobutylene, pentene, octene-1, or styrene. The polymers can be homopolymers such as polyisobutylene, as well as copolymers of two or more of such olefins such as copolymers of: ethylene and propylene; butylene and isobutylene; propylene and isobutylene. Other copolymers include those in which a minor molar amount of the copolymer monomers e.g., 1 to 10 mole % is a $C_4$ to $C_{18}$ diolefin, e.g., a copolymer of isobutylene and butadiene; or a copolymer of ethylene, propylene and 1,4-hexadiene.

In one embodiment, at least one R of formula (I) is derived from polybutene, that is, polymers of C4 olefins, including 1-butene, 2-butene and isobutylene. C4 polymers can include polyisobutylene. In another embodiment, at least one R of formula (I) is derived from ethylene-alpha olefin polymers, including ethylene-propylene-diene polymers. Ethylene-alpha olefin copolymers and ethylene-lower olefin-diene terpolymers are described in numerous patent documents, including European patent publication EP 0 279 863 and the following U.S. Pat. Nos. 3,598,738; 4,026,809; 4,032,700; 4,137,185; 4,156,061; 4,320,019; 4,357,250; 4,658,078; 4,668,834; 4,937,299; 5,324,800 each of which are incorporated herein by reference for relevant disclosures of these ethylene based polymers.

In another embodiment, the olefinic bonds of formula (I) are predominantly vinylidene groups, represented by the following formulas:

wherein R is a hydrocarbyl group

wherein R is a hydrocarbyl group.

In one embodiment, the vinylidene content of formula (I) can comprise at least about 30 mole % vinylidene groups, at least about 50 mole % vinylidene groups, or at least about 70 mole % vinylidene groups. Such material and methods for preparing them are described in U.S. Pat. Nos. 5,071,919; 5,137,978; 5,137,980; 5,286,823; 5,408,018, 6,562,913, 6,683,138, 7,037,999 and U.S. Publication Nos. 20040176552A1, 20050137363 and 20060079652A1, which are expressly incorporated herein by reference, such products are commercially available by BASF, under the tradename GLISSOPAL® and by Texas PetroChemical LP, under the tradename TPC1105™ and TPC 595™.

Methods of making hydrocarbyl substituted carboxylic acids from the reaction of the monounsaturated carboxylic acid reactant and hydrocarbyl substituents are well known in the art and disclosed in the following patents: U.S. Pat. Nos.

3,361,673 and 3,401,118 to cause a thermal "ene" reaction to take place; U.S. Pat. Nos. 3,087,436; 3,172,892; 3,272,746, 3,215,707; 3,231,587; 3,912,764; 4,110,349; 4,234,435; 6,077,909; 6,165,235 and are hereby incorporated by reference.

Particular examples of hydrocarbyl substituted carboxylic acids can include, but not be limited to, for example, dodecenyl succinic anhydride; dodecenyl dimethyl succinate; octadecenyl succinic anhydride; hexane sebacic acid; octadecane cyclohexane-1,2-dicarboxylic acid. Further examples can include polyisobutylene succinic acid or polyisobutylene succinic anhydride.

The Polyalkylene Glycol Component

Suitable polyalkylene glycols can include polyether polyols derived from a diol or polyol having a total of from 2 to 15 carbon atoms, in some embodiments an alkyl diol or glycol which is reacted with an ether comprising an alkylene oxide having from 2 to 6 carbon atoms, typically ethylene oxide or propylene oxide or mixtures thereof. For example, hydroxyl functional polyethers can be produced by first reacting propylene glycol with propylene oxide followed by subsequent reaction with ethylene oxide. Primary hydroxyl groups resulting from ethylene oxide are more reactive than secondary hydroxyl groups and thus are preferred. Useful commercial polyalkylene oxides include poly(ethylene glycol) comprising ethylene oxide reacted with ethylene glycol, and poly(propylene glycol) comprising propylene oxide reacted with propylene glycol. The various polyalkylene glycols generally have a number average molecular weight (Mn) as determined by assay of the terminal functional groups which is an average molecular weight of at least about 150, or about 600, such as from about 700 to about 10,000, from about 1,450 to about 5,000, or from about 1,450 to about 2,500 or about 1,000, or even 2,000.

In some embodiments, the polyalkylene glycol component includes poly(propylene glycol), poly(ethylene glycol), copolymers of poly(ethylene glycol) and poly(propylene glycol), and the like, or combinations thereof. In some embodiments the polyalkylene glycol component includes poly(propylene glycol), for example, a poly(propylene glycol) of less than 2000 Mn, such as from 150 or 1000 to 2000 Mn. In further embodiments, the polyalkylene glycol can include propylene glycol, diethylene glycol, decylene glycol, and the like, or combinations thereof.

Preparation Process

The oligomer may be formed, for example, by a simple condensation reaction between the hydrocarbyl substituted carboxylic acid and the polyalkylene glycol.

Chemistry

While the oligomer reaction product will be a mixture of various compounds, in general the oligomer can include hydrocarbyl substituted succans condensed with the polyalkylene glycol. For example, the reaction product may include compounds of formula

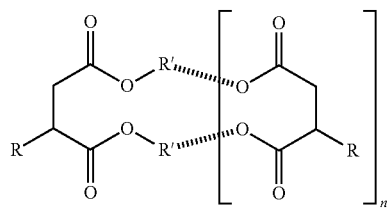

where R is the hydrocarbyl substituent,

R' is, independently, either H or the reacted derivative of the polyalkylene glycol, and n is 0 or 1.

The dashed line indicates that where R' is a reacted derivative of the polyalkylene glycol, the reacted polyalkylene glycol derivative may or may not react with a second succan to form a link between a first succan and a second succan. To the extent R' at either position on the first succan does not react with a second succan, an R' group may be included on the respective oxygen atoms in the second succan.

The term "reacted derivative of the polyalkylene glycol" is intended to encompass the simple polyalkylene derived moiety condensed onto the succan, as well as polyalkylene glycol derived moieties that may have been further condensed at the other end of the polyalkylene glycol moiety with an additional succan.

Of course, the oligomer mixture may also include some minor portion of unreacted hydrocarbyl substituted carboxylic acid component as well as unreacted polyalkylene glycol.

The oligomer may be present in the additive composition from about 1 to about 100 wt %, such as, for example, about 30 to about 90 wt %, or about 35 to about 80 wt %. In an embodiment, the oligomer may be present in the additive from about 40 to about 60 wt %, or 45 to about 55 wt %.

Amine

The additive composition can additionally include at least one amine, such as, for example, a monoamine, a hydroxyamine, polyamines, and combinations thereof.

The monoamines generally contain from 1 to about 24 carbon atoms, or from about 1 to about 12 carbon atoms, or even from about 1 to about 6 carbon atoms. Examples of monoamines include methylamine, ethylamine, propylamine, butylamine, octylamine, and dodecylamine. Examples of secondary monoamines include dimethylamine, diethylamine, dipropylamine, dibutylamine, methylbutyl-amine, ethylhexylamine, etc. Tertiary monoamines include trimethylamine, tributylamine, methyl di ethyl amine, ethyl-dibutylamine, etc.

Typically, the hydroxyamines are primary, secondary or tertiary alkanolamines or mixtures thereof. Such amines can be represented by the formulae:

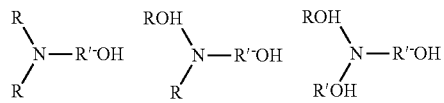

where each R is, independently, a hydrocarbyl group of from about 1 to about 8 carbon atoms, and R' is a divalent aliphatic or aromatic hydrocarbyl group of about 2 to about 18 carbon atoms. Examples can include, but not be limited to, ethanolamine, diethanolamine, triethanolamine, and the like, or combinations thereof.

Hydroxyamines can also include heterocyclic hydroxyamines. Examples of heterocyclic hydroxyamines include N-(hydroxyl lower alkyl)-morpholines, -thiomorpholines, -piperidines, -oxazolidines, -thiazolidines and the like. The hydroxyamines can also be an ether N-(hydroxyhydrocarbyl)amine. These are hydroxypoly(hydrocarbyloxy) analogs of the above-described hydroxy amines (these analogs also include hydroxyl-substituted oxyalkylene analogs).

The polyamines may be aliphatic, cycloaliphatic, heterocyclic or aromatic. Examples of the polyamines include alkylene polyamines and heterocyclic polyamines. Such alkylene polyamines include, but are not limited to methylene polyamines, ethylene polyamines, butylene polyamines, propylene polyamines, pentylene polyamines, etc. The higher homologs and related heterocyclic amines such as piperazines and N-amino alkyl-substituted piperazines are also included. Specific examples of such polyamines are ethylene diamine, triethylene tetramine, tris-(2-aminoethyl) amine, propylene diamine, trimethylene diamine, tripropylene tetramine, tetraethylene pentamine, hexaethylene heptamine, pentaethylenehexamine, etc.

Hydroxy heterocyclic polyamines are also useful. Examples include N-(2-hydroxyethyl)cyclohexyl-amine, 3-hydroxycyclopentylamine, parahydroxyaniline, N-hydroxyethylpiperazine, and the like.

The amine may be present, together with the oligomer, in the additive composition at from about 1 to about 100 wt % of the additive composition, such as, for example, about 30 to about 90 wt %, or about 35 to about 80 wt %. In an embodiment, the amine and oligomer may be present together in the additive from about 40 to about 60 wt %, or 45 to about 55 wt %.

When present, the oligomer and amine may be included at a ratio of oligomer to amine of about 1:20 to about 20:1, more commonly, about 1:15 to about 15:1. In some embodiments, the ratio may be from about 1:10 to about 10:1, or from about 1:5 to about 5:1, or even from about 2:3 to about 3:2.

In some embodiments the additive composition can be free of, or substantially free of, amine. By "substantially free of amine," it is meant that there is an insufficient amount of amine present in the additive composition to effect the efficacy of the composition within a water based drilling fluid, such as, for example, less than 0.01 wt % in the water based drilling fluid, or less than 10 ppm, or less than 1 ppm, or less than 0.1 ppm in the water based drilling fluid.

Metal Thiophosphates

In some embodiments, the additive composition will further include a metal thiophosphate compound. Metal dialkyldithiophosphates may be described as primary metal dialkyldithiophosphates or as secondary metal dialkyldithiophosphates, depending on the structure of the alcohol used in its preparation. In some embodiments the compositions of the invention include primary metal dialkyldithiophosphates. In some embodiments the compositions of the invention include secondary metal dialkyldithiophosphates. In some embodiments the compositions of the invention include a mixture of primary and secondary metal dialkyldithiophosphates. In some embodiments the additive composition can include a mixture of primary and secondary metal dialkyldithiophosphates where the ratio of primary metal dialkyldithiophosphates to secondary metal dialkyldithiophosphates (on a weight basis) is at least 1:1, or even at least 1:1.2, or even at least 1:1.5 or 1:2, or 1:10. The metals in the metal dialkyldithiophosphate can include any alkali metal, alkaline earth metal, or transition metal. Particularly suitable metals include, for example, zinc, calcium or barium, with zinc dialkyldithiophosphates being preferred. Examples include, Examples of metal dithiophosphates include zinc isopropyl methylamyl dithiophosphate, zinc isopropyl isooctyl dithiophosphate, zinc di(cyclohexyl) dithiophosphate, zinc isobutyl 2-ethylhexyl dithiophosphate, zinc isopropyl 2-ethylhexyl dithiophosphate, zinc isobutyl isoamyl dithiophosphate, zinc isopropyl n-butyl dithiophosphate, calcium di(hexyl) dithiophosphate, and barium di(nonyl) dithiophosphate.

In some embodiments the additive composition can include a mixture of primary and secondary metal dialkyldithiophosphates that is at least 50 percent by weight primary, or even at least 60, 70, 80, or even 90 percent by weight primary. In some embodiments the additive composition can be free of, or substantially free of, primary metal dialkyldithiophosphates. By "substantially free of primary metal dialkyldithiophosphates," it is meant that there is an insufficient amount of primary metal dialkyldithiophosphates present in the additive composition to effect the efficacy of the composition within a water based drilling fluid, such as, for example, less than 0.01 wt % in the water based drilling fluid, or less than 10 ppm, or less than 1 ppm, or less than 0.1 ppm in the water based drilling fluid.

The additive composition can include from about 0.01 to about 10 wt % of the metal dithiophosphate compound, such as a zinc dialkyldithiophosphate compound. In some embodiments, the additive composition can include from about 0.1 to about 8 wt %, or from about 1 to about 6 wt %. In embodiments which include the metal dithiophosphate, the dithiophosphate can be present in the additive composition at a ratio of from about 1:1 to about 15:1 of the oligomer to metal dithiophosphate, and in another embodiment from about 1:1 to 10:1, and in a further embodiments from about 2:1 to about 9:1.

Sulfurized Olefin

The additive composition may further include a sulfurized olefin. Sulfurized olefins are well known commercial materials. A suitable sulfurized olefin is one which is prepared in accordance with the detailed teachings of U.S. Pat. Nos. 4,957,651 and 4,959,168. Described therein is a co-sulfurized mixture of 2 or more reactants selected from the group consisting of at least one fatty acid ester of a polyhydric alcohol, at least one fatty acid, at least one olefin, and at least one fatty acid ester of a monohydric alcohol. The olefin component may be an aliphatic olefin, which usually will contain 4 to 40 carbon atoms. Mixtures of these olefins are commercially available. The sulfurizing agents useful in the process for producing the sulfurized olefin can include elemental sulfur, hydrogen sulfide, sulfur halide plus sodium sulfide, and a mixture of hydrogen sulfide and sulfur or sulfur dioxide.

Sulfurized olefins may be present from about 0.01 to about 10 wt. %. In an embodiment, the sulfurized olefin may be present from about 0.1 to about 8 wt %, or from about 1 to about 6 wt % of the additive composition. In some embodiments the additive composition can be free of, or substantially free of, sulfurized olefin. By "substantially free of sulfurized olefin," it is meant that there is an insufficient amount of sulfurized olefin present in the additive composition to effect the efficacy of the composition within a water based drilling fluid, such as, for example, less than 0.01 wt % in the water based drilling fluid, or less than 10 ppm, or less than 1 ppm, or less than 0.1 ppm in the water based drilling fluid.

Water Based Drilling Fluid and Methods of Use of the Additive Composition

Also included in the present technology is a water based drilling fluid containing the above additive composition. The water based drilling fluid can include, for example, water, the herein described additive composition, and other additives suitable for water based drilling fluids. The water based drilling fluid can include the additive composition from about 0.01 to about 10 wt. %, such as, for example, about 0.5 to about 5 wt %, or from about 0.1 to about 3 wt % of the total water based drilling fluid.

The additive composition described herein can be, in some embodiments, utilized in drilling fluids to increase the lubricity of the drilling fluid, and in some embodiments, to reduce the coefficient of friction of the drilling fluid. The additive composition may also clean debris and residue from the formation after drilling the wellbore so that the well can be completed and prepared for production.

The amount of each chemical component described is presented exclusive of any solvent or diluent oil, which may be customarily present in the commercial material, that is, on an active chemical basis, unless otherwise indicated. However, unless otherwise indicated, each chemical or composition referred to herein should be interpreted as being a commercial grade material which may contain the isomers, by-products, derivatives, and other such materials which are normally understood to be present in the commercial grade.

As used herein, the term "hydrocarbyl substituent" or "hydrocarbyl group" is used in its ordinary sense, which is well-known to those skilled in the art. Specifically, it refers to a group having a carbon atom directly attached to the remainder of the molecule and having predominantly hydrocarbon character. Examples of hydrocarbyl groups include:

hydrocarbon substituents, that is, aliphatic (e.g., alkyl or alkenyl), alicyclic (e.g., cycloalkyl, cycloalkenyl) substituents, and aromatic-, aliphatic-, and alicyclic-substituted aromatic substituents, as well as cyclic substituents wherein the ring is completed through another portion of the molecule (e.g., two substituents together form a ring);

substituted hydrocarbon substituents, that is, substituents containing non-hydrocarbon groups which, in the context of this invention, do not alter the predominantly hydrocarbon nature of the substituent (e.g., halo (especially chloro and fluoro), hydroxy, alkoxy, mercapto, alkylmercapto, nitro, nitroso, and sulfoxy);

hetero substituents, that is, substituents which, while having a predominantly hydrocarbon character, in the context of this invention, contain other than carbon in a ring or chain otherwise composed of carbon atoms and encompass substituents as pyridyl, furyl, thienyl and imidazolyl. Heteroatoms include sulfur, oxygen, and nitrogen. In general, no more than two, or no more than one, non-hydrocarbon substituent will be present for every ten carbon atoms in the hydrocarbyl group; alternatively, there may be no non-hydrocarbon substituents in the hydrocarbyl group.

It is known that some of the materials described above may interact in the final formulation, so that the components of the final formulation may be different from those that are initially added. For instance, metal ions (of, e.g., a detergent) can migrate to other acidic or anionic sites of other molecules. The products formed thereby, including the products formed upon employing the composition of the present invention in its intended use, may not be susceptible of easy description. Nevertheless, all such modifications and reaction products are included within the scope of the present invention; the present invention encompasses the composition prepared by admixing the components described above.

As used herein, the term "about" means that a value of a given quantity is within ±20% of the stated value. In other embodiments, the value is within ±15% of the stated value. In other embodiments, the value is within ±10% of the stated value. In other embodiments, the value is within ±5% of the stated value. In other embodiments, the value is within ±2.5% of the stated value. In other embodiments, the value is within ±1% of the stated value.

Additionally, as used herein, the term "substantially" means that a value of a given quantity is within ±10% of the stated value. In other embodiments, the value is within ±5% of the stated value. In other embodiments, the value is within ±2.5% of the stated value. In other embodiments, the value is within ±1% of the stated value.

The invention herein is useful in water based drilling fluids to increase lubricity and reduce the coefficient of friction in the fluid, which may be better understood with reference to the following examples.

EXAMPLES

Sample 1

1000 parts by weight of octadecenylsuccinic anhydride is mixed with 48 parts by weight of dodecenyl succinic anhydride for 30 minutes until a uniform mixture is obtained. Diethylene glycol, 564 parts by weight, is then added and the resulting mixture is heated to 105-110° C. and held until the acid number is in the range of 94-102 mg KOH/g.

Sample 2

1000 parts by weight of the Sample 1 is heated to about 45-50° C. and then 666.7 parts by weight of triethanolamine is added. The resulting mixture is stirred for 1 hour, giving a product having an acid number in the range of 54-64 mg KOH/g and a 1 wt % aqueous pH of 8.0-8.5.

Sample 3

1000 parts by weight of Sample 1 is heated to about 45-50° C. and then a mixture of amines consisting of 50.4 parts by weight of triethanolamine, 25.2 parts by weight of monoethanolamine, and 185.4 parts by weight of 3-(tridecyloxy)-1-propanamine is added. The resulting mixture is stirred for 1 hour, giving a product having an acid number in the range of 71-88 mg KOH/g and a 1 wt % aqueous pH of 7.8-8.8.

Example 1

The water based drilling fluid of Table 1 was top treated with Samples 1, 2 and 3. The mud was aged at 150° F. for 16 hours by hot roll and then tested for lubricity.

TABLE 1

| Control Fluid | |
| --- | --- |
| Ingredient | Amount (g) |
| Water | 287 |
| API Bentonite | 25 |
| Lignosulfonate | 2 |
| Lignite | 2 |
| Caustic Soda | 0.75 |
| PAC | 0.1 |
| Rev dust | 25 |
| Barite | 165 |

The lubricity was studied using an Ofite E&P lubricity tester to find the coefficient of friction ("COF") of the fluid. The COF for the fluids tested is provided in Table 2 below.

TABLE 2

| Sample | COF | % Reduction in COF from Control Mud |
| --- | --- | --- |
| Water | 0.351 | |
| Control Mud | 0.293 | |
| Control Mud + 1 wt % Sample 2 | 0.241 | 18% |
| Control Mud + 1 wt % Sample 3 | 0.204 | 30% |
| Control Mud + 2 wt % Sample 3 | 0.181 | 38% |

Samples 4 to 7

Lubricant additive compositions were prepared as shown in Table 3 by combining the oligomer or oligomer/amine of samples 1 to 3 with either a sulfurized olefin or a zinc dialkyldithiophosphate with stirring for 5 minutes in a solvent using a mixer at moderate speed.

TABLE 3

| Ingredient | Sample 4 (g) | Sample 5 (g) | Sample 6 (g) | Sample 7 (g) |
|---|---|---|---|---|
| Sample 1 | | | | 50 |
| Sample 3 | 50 | 45 | 45 | |
| Sulfurized Olefin | | 5 | | |
| Metal Dialkyldithio-phosphate | | | 5 | |
| Solvent | 50 | 50 | 50 | 50 |

Example 2

In the next experiment, the samples base formulation shown in Table 4 was top treated with samples 4 through 7.

TABLE 4

Control Fluid

| Ingredient | Amount (g) |
|---|---|
| Water | 287 |
| API Bentonite | 25 |
| Lignosulfonate | 2 |
| Lignite | 1.7 |
| Caustic Soda | 0.75 |
| PAC | 0.1 |
| Rev dust | 25 |
| Barite | 165 |

The fluids were allowed to age at 150° F. for 4 hours by hot roll before testing for the COF values shown in Table 5.

TABLE 5

| Sample | COF BEFORE AGING | % Reduction in COF from Control Mud BEFORE AGING | COF AFTER AGING | % Reduction in COF from Control Mud BEFORE AGING |
|---|---|---|---|---|
| Water | 0.343 | | 0.353 | |
| Control Mud | 0.344 | | 0.341 | |
| Control Mud + 2 wt % Sample 4 | 0.207 | 41% | 0.228 | 33% |
| Control Mud + 2 wt % Sample 5 | 0.163 | 54% | 0.189 | 45% |
| Control Mud + 2 wt % Sample 6 | 0.173 | 50% | 0.201 | 41% |
| Control Mud + 2 wt % Sample 7 | 0.205 | 40% | — | — |

Samples 8 to 10

Lubricant additive compositions were prepared as shown in Table 6 by combining the oligomer or oligomer/amine of samples 1 to 3 with a sulfurized olefin with stirring for 5 minutes in a solvent using a mixer at moderate speed.

TABLE 6

| Ingredient | Sample 8 (g) | Sample 9 (g) | Sample 10 (g) |
|---|---|---|---|
| Sample 1 | 47.5 | | |
| Sample 2 | | 47.5 | |
| Sample 3 | | | 47.5 |
| Sulfurized Olefin | 2.5 | 2.5 | 2.5 |
| Solvent | 50 | 50 | 50 |

Example 3

Lubricity of water based drilling muds containing samples 8 to 10 was tested in the formulation shown in Example 2. Results of the lubricity test are provided in Table 7 below.

TABLE 7

| Sample | COF | % Reduction in COF from Control Mud |
|---|---|---|
| Water | 0.349 | |
| Control Mud | 0.325 | |
| Control Mud + 1 wt % Sample 8 | 0.199 | 39% |
| Control Mud + 2 wt % Sample 8 | 0.182 | 44% |
| Control Mud + 1 wt % Sample 9 | 0.179 | 32% |
| Control Mud + 2 wt % Sample 9 | 0.148 | 44% |
| Control Mud + 1 wt % Sample 10 | 0.179 | 34% |
| Control Mud + 2 wt % Sample 10 | 0.158 | 42% |

Each of the documents referred to above is incorporated herein by reference, including any prior applications, whether or not specifically listed above, from which priority is claimed. The mention of any document is not an admission that such document qualifies as prior art or constitutes the general knowledge of the skilled person in any jurisdiction. Except in the Examples, or where otherwise explicitly indicated, all numerical quantities in this description specifying amounts of materials, reaction conditions, molecular weights, number of carbon atoms, and the like, are to be understood as modified by the word "about." It is to be understood that the upper and lower amount, range, and ratio limits set forth herein may be independently combined. Similarly, the ranges and amounts for each element of the invention can be used together with ranges or amounts for any of the other elements.

As used herein, the transitional term "comprising," which is synonymous with "including," "containing," or "characterized by," is inclusive or open-ended and does not exclude additional, un-recited elements or method steps. However, in each recitation of "comprising" herein, it is intended that the term also encompass, as alternative embodiments, the phrases "consisting essentially of" and "consisting of," where "consisting of" excludes any element or step not specified and "consisting essentially of" permits the inclusion of additional un-recited elements or steps that do not materially affect the essential or basic and novel characteristics of the composition or method under consideration.

While certain representative embodiments and details have been shown for the purpose of illustrating the subject invention, it will be apparent to those skilled in this art that various changes and modifications can be made therein without departing from the scope of the subject invention. In this regard, the scope of the invention is to be limited only by the following claims.

What is claimed is:

1. A water based drilling fluid comprising water and 0.01 to 10 wt % of a reaction product of:
   a. at least one hydrocarbyl substituted carboxylic acid or an ester or anhydride thereof; and
   b. at least one polyalkylene glycol wherein the hydrocarbyl substituent of the hydrocarbyl substituted carboxylic acid comprises a $C_6$ to $C_{36}$ straight chain or branched alkane or alkene, and further comprising at least on of: i) 0.01 to 10 wt. % of a metal dithiophosphate, and ii) 0.01 to 10 wt. % of a sulfurized olefin.

2. The additive composition of claim 1, wherein the carboxylic acid of the hydrocarbyl substituted carboxylic acid comprises oxalic acid, malonic acid, succinic acid, glutaric acid, adipic acid, pimelic acid, suberic acid, azelic acid, sebacic acid, undecanedioic acid, dodecanedioic acid, maleic acid, fumaric acid, glutaconic acid, traumatic acid and muconic acid, phthalic acid, isophthalic acid, terephthalic acid or diphenic acid.

3. The additive composition of claim 1, wherein the hydrocarbyl substituted carboxylic acid comprises dodecenyl succinic anhydride.

4. The additive composition of claim 1, wherein the hydrocarbyl substituted carboxylic acid comprises octadecenyl succinic anhydride.

5. The additive composition of claim 1 wherein the polyalkylene glycol comprises one or more of polyethylene glycol or polypropylene glycol.

6. The additive composition of claim 1, wherein the polyalkylene glycol comprises diethylene glycol.

7. The additive composition of claim 5, wherein the polyalkylene glycol comprises polypropylene glycol having a Mn of less than 2000.

8. The additive composition of claim 1, further comprising at least one amine.

9. The additive composition of claim 8, wherein the amine comprises at least one alkanolamine.

10. The additive of claim 9 comprising at least one of ethanolamine, diethanolamine, triethanolamine, and mixtures thereof.

11. The additive composition of claim 1, wherein the oligomer or a blend of the oligomer and the amine is present in the additive from about 1 to about 100 wt %.

12. The additive composition of claim 1, wherein the metal dithiophosphate compound comprises zinc dialkyldithiophosphate.

13. A method of lubricating a drilling fluid, comprising: adding to the drilling fluid an additive composition as claimed in claim 1.

14. A method of increasing the lubricity and decreasing the coefficient of friction of a water-based drilling fluid by adding to the water-based drilling fluid an additive composition as claimed in claim 1.

* * * * *